United States Patent

[11] 3,577,728

[72] Inventors Joe W. Von Brimer
  Sherman Oaks;
  Herman P. Roth, Manhattan Beach, Calif.
[21] Appl. No. 809,480
[22] Filed Mar. 19, 1969
[45] Patented May 4, 1971
[73] Assignee said Von Brimer to General Scientific
  Laboratories, Inc., fractional part interest
  Continuation of application Ser. No.
  601,468, Dec. 13, 1966, now abandoned.

[54] EXHAUST GAS PROCESSING SYSTEM
  27 Claims, 25 Drawing Figs.
[52] U.S. Cl................................................. 60/30,
  23/277
[51] Int. Cl..................................................... F01n 3/10
[50] Field of Search........................................... 60/264,
  39.49, 29, 30, 32, 39.5, 39.71, 39.46; 230/95, 92;
  23/277 (C), (Inquired), 2 (C); 48/107, 212;
  110/8 (A), 18 (A); 431/173, 5, (Inquired)

[56] References Cited
UNITED STATES PATENTS

| | | | |
|---|---|---|---|
| 1,217,021 | 2/1917 | Lebedeff...................... | 60/32 |
| 2,203,554 | 6/1940 | Uhri............................ | 60/30 |
| 2,293,632 | 8/1942 | Sauer........................... | 60/30 |
| 2,938,658 | 5/1960 | Foster.......................... | 60/264 |
| 3,306,525 | 2/1967 | Dornier........................ | 417/171 |
| 2,707,444 | 5/1955 | Van Loon..................... | 431/173 |

FOREIGN PATENTS

| | | | |
|---|---|---|---|
| 859,723 | 9/1940 | France......................... | 60/32 |
| 1,004,785 | 9/1965 | Great Britain................ | 60/32 |

*Primary Examiner*—Douglas Hart
*Attorney*—Robert C. Smith

ABSTRACT: An exhaust gas processing device for use with internal combustion engines which is generally of the afterburner type, including a cylindrical reactor in which the unburned hydrocarbons are consumed and an exhaust pipe connected near one end of the cylindrical reactor in such manner as to direct the flow of gases tangentially into the reactor to produce a vortical flow pattern to assure adiabatic heating and mixing with air from outside the reactor chamber. Various arrangements are described for igniting the mixture in the chamber, for controlling the effective area of the exhaust gas inlet to the reactor and the air inlet to the reactor, for controlling the reactor outlet including additional air mixing, means for compounding the reactors and for using a plurality of reactors for multicylinder engines. Arrangements are also shown for utilizing the heat radiating from the sides of the reactor to heat the incoming air and for conserving the heat by means of an insulating layer or a labyrinth structure which redirects the exhaust flow back across the outside of the reactor cylinder. A still further embodiment utilizes a helical member within the reactor chamber to direct the flow in a vortical pattern which also is effective to reduce sound output.

PATENTED MAY 4 1971 3,577,728

INVENTOR.
JOE W. von BRIMER
BY HERMAN P. ROTH

Robert C. Smith
ATTORNEY

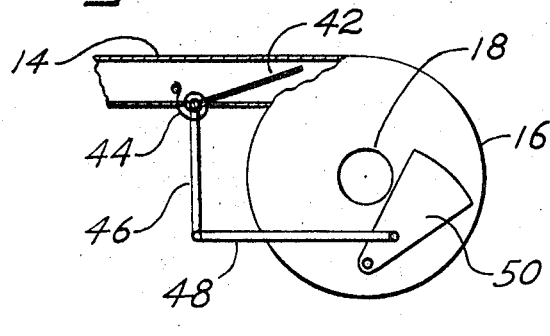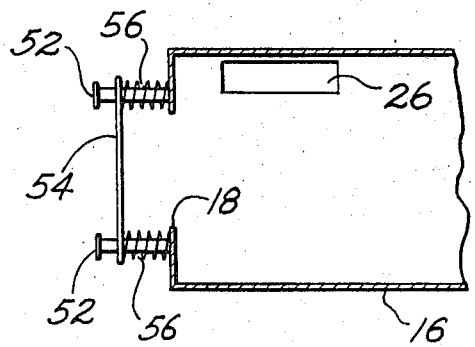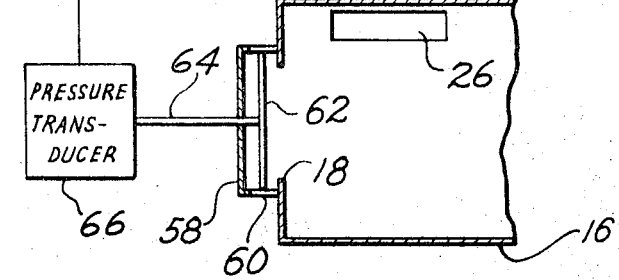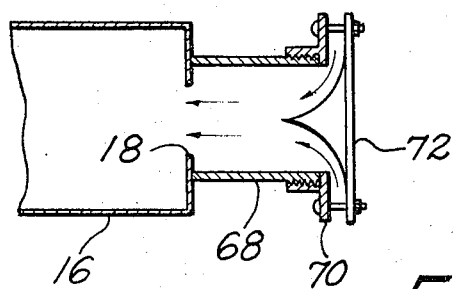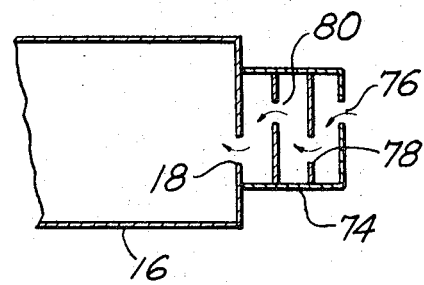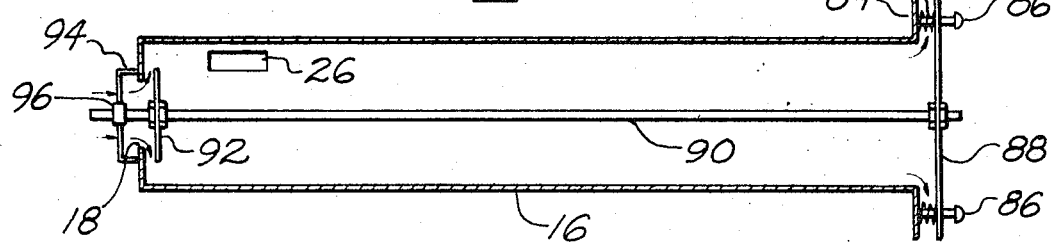

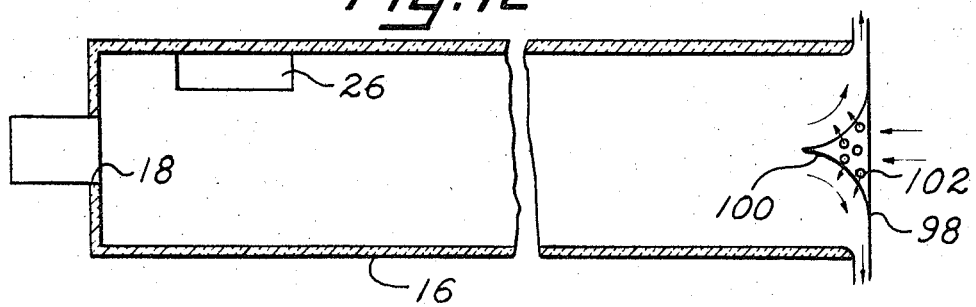
Fig.12
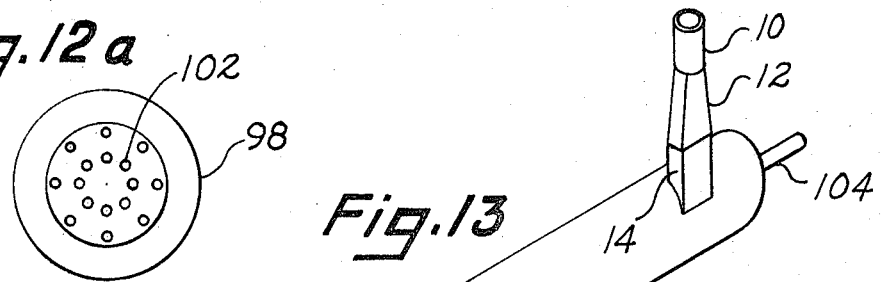
Fig.12a
Fig.13
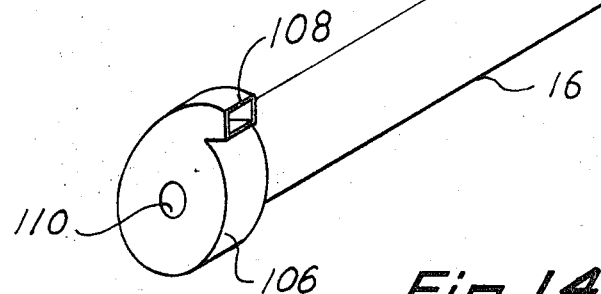
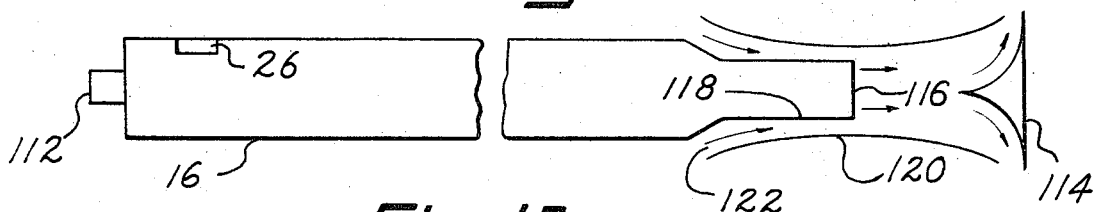
Fig.14
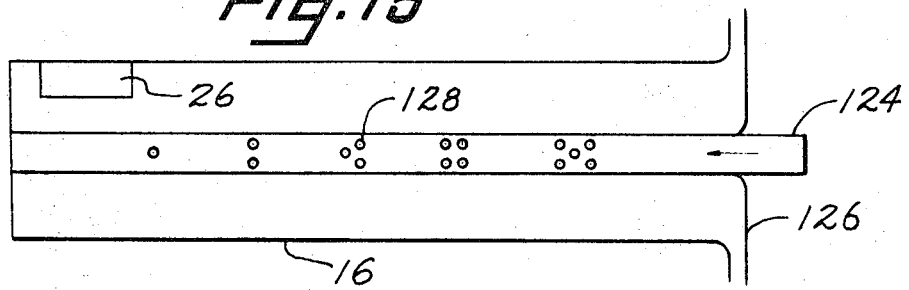
Fig.15
INVENTOR.
JOE W. von BRIMER
HERMAN P. ROTH
BY
Robert C. Smith
ATTORNEY

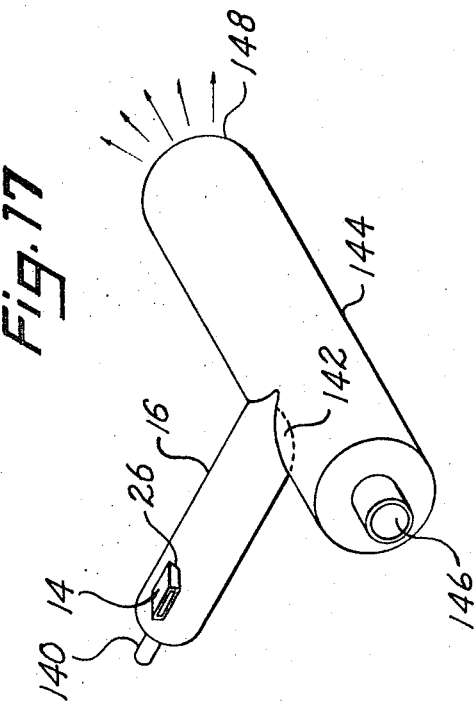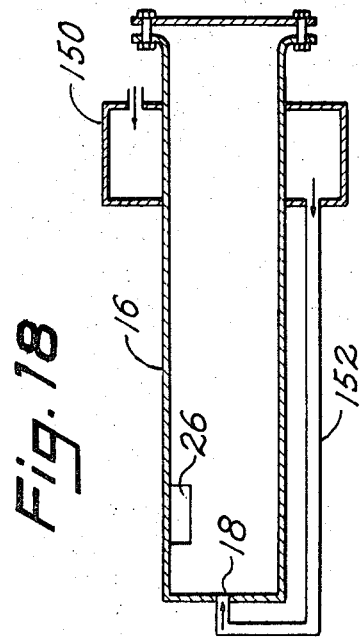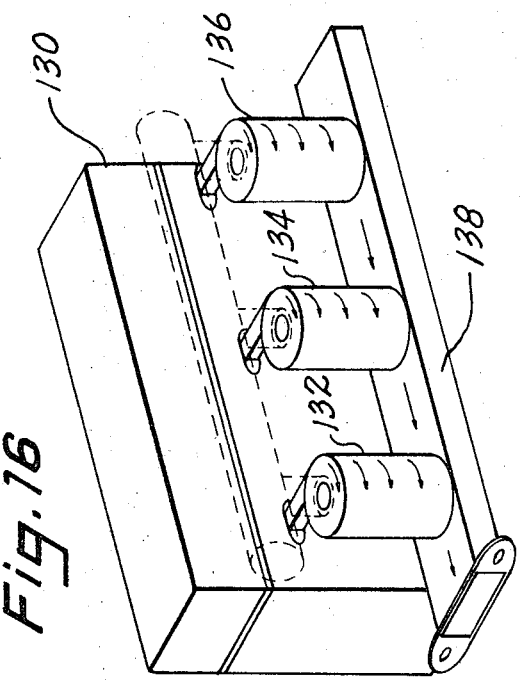

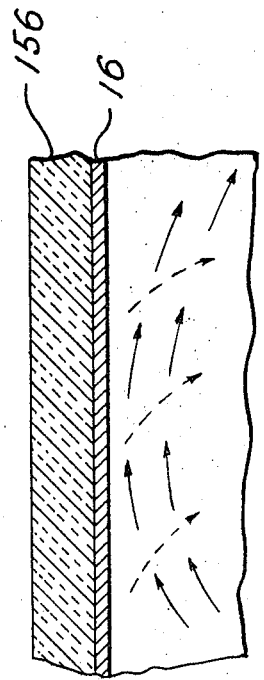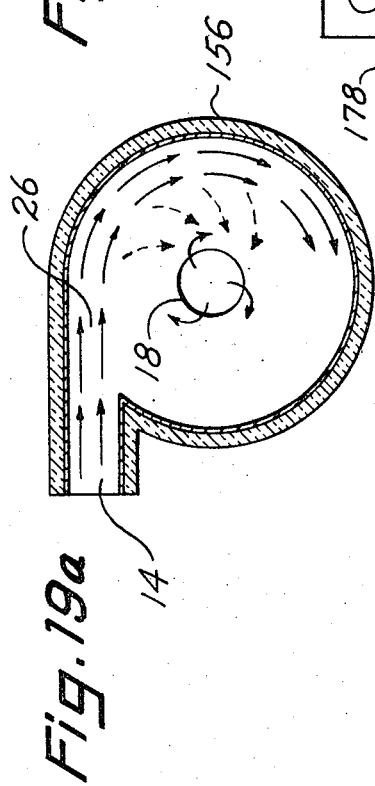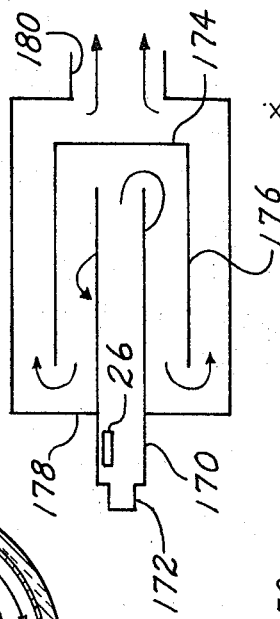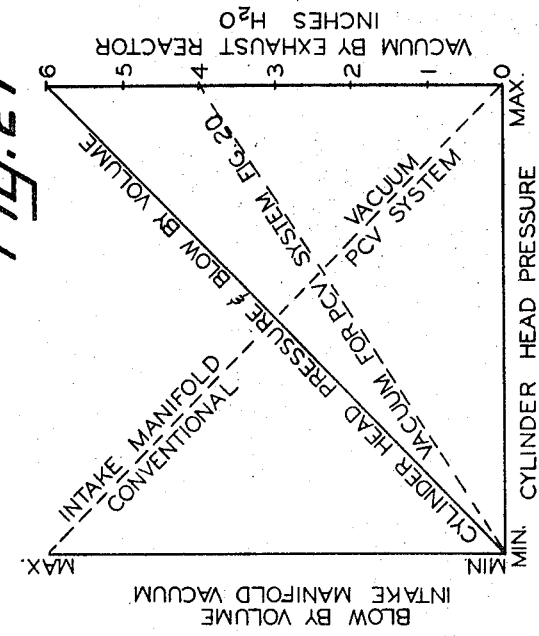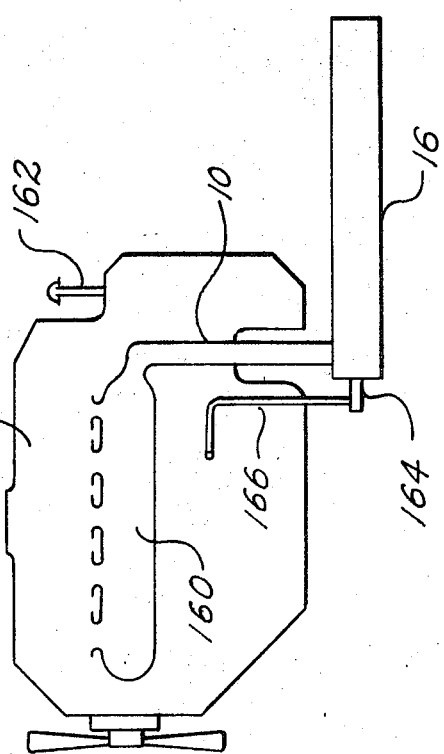
INVENTOR.
JOE W. von BRIMER
BY HERMAN P. ROTH
Robert C. Smith
ATTORNEY

EXHAUST GAS PROCESSING SYSTEM

The present application is a continuation of application Ser. No. 601,468, filed Dec. 3, 1966, now abandoned. This invention relates to exhaust gas processing systems for engines and more particularly to an exhaust system having special advantages in reducing undesirable exhaust emissions and in improving engine efficiency.

The problem of dealing with air pollution from automobile exhaust has grown progressively more serious with increasing numbers of automobiles in use. There have been numerous efforts to identify the nature of exhaust air pollutions, and these have resulted in establishing reasonably well both the nature of the pollution and the engine operating regimes in which the pollution problems are most serious. The major contributor is unburned hydrocarbons which are emitted during all engine operation, but are particularly heavy during idle, acceleration and deceleration regimes. Another source of unburned hydrocarbons is blowby of vaporized air-fuel mixture which is forced by the pistons into the crankcase, from which it is commonly vented to the atmosphere. Other air pollution products which are known to emanate from engines are carbon monoxide and nitrous oxides (commonly designated as NO and $NO_2$ and collectively as NOX).

To effect a substantial reduction in the emission of unburned hydrocarbons, one of the techniques which has been used is to build engine mufflers including catalytic reactors, the catalyst used typically being a screen or exposed surface of a catalytic metal or compound such as vanadium or platinum or their oxides which aids the combustion of the hydrocarbons. These devices have generally not been fully satisfactory since the catalytic elements have tended to become poisoned by the pollutants or by substances in the fuel, such as lead compounds, reducing their effectiveness in a cumulative process. The catalytic material has also required means to protect it during high speed driving, which has meant bypassing the catalytic element. The result has been a requirement for mechanical moving parts which tend to malfunction in the high temperature environment. Thus neither the long term standards of performance nor the operating life of catalytic devices in the exhaust flow have met the standards set by governing agencies.

Another device, somewhat similar to the catalytic reactors, which has been used to oxidize the unburned hydrocarbons in exhaust devices, is the afterburner. Afterburners, as they have been used in the prior art, are somewhat effective in reducing emissions, but, depending upon their particular configuration, suffer from any of a number of shortcomings and thus have never really proved sufficiently successful to become marketable. Control of temperatures has been a problem, and excessive temperatures have tended to cause unacceptably short life. While provisions have been made for providing air for combustion, this has not usually been controlled adequately. Part of the problem in air supply has been inadequate combustion due to inadequate mixing and a failure to recognize that appreciable time is required for the oxidation reaction to take place. Where these needs have been recognized to greater or less extent, the resulting device has usually been too heavy and bulky for reasonable installations and acceptable costs, especially where adequate means are included to insure acceptable exhaust temperatures.

Another of the approaches to reducing engine emissions has been in the form of the positive crankcase ventilation device which typically consists of a pipe extending between the crankcase of the engine and the air inlet to the carburetor for venting the crankcase fumes into the carburetor to cause the fumes to be burned in the engine. The pipe includes a valve which must meter the blowby gases as the intake manifold pressure varies and must block off backfire flows which could let raw fuel flow from the carburetor into the crankcase. This device was never expected to eliminate more than a substantial fraction of emissions, but was adopted because it was simple and comparatively inexpensive. Unfortunately, the positive crankcase ventilation valve, if neglected, can cause significant engine maintenance problems.

The more recent attempts to deal with engine emissions have led to different approaches, one being to resort to very careful tuning of the engine toward lean mixtures and modification of ignition timing. Such procedures reduce emissions somewhat, but cause significant losses in power output and require more frequent, exacting and expensive engine maintenance. Another technique is to provide an engine-driven pump to inject air into exhaust passages to enable the unburned fuel to be burned in the exhaust manifold. This latter system is also effective to reduce emissions significantly but does introduce definite disadvantages since the necessary extra parts are costly to produce, and to achieve optimum results modifications are required to engine cylinder head, ignition timing, and carburetion. Additional heating loads are imposed by both types of systems which require larger radiators, larger fans, higher fan speeds, and/or the use of fan shrouds. It is apparent, of course, that the additional parts required necessarily introduce some reliability problems. On the other hand, it has been found that while air introduced at the exhaust ports can reduce unburned hydrocarbon emissions, substantial increase in the emission of nitrogen oxides (NOX) results. An additional limitation is that the extra air for combustion is supplied by the pump substantially in accordance with the instantaneous engine speed, although exhaust emissions may vary considerably at a given speed depending upon whether the engine is accelerating, decelerating, or maintaining a constant speed without a change in load. Typically, the standards for exhaust emissions set by the regulating agencies, such as the Motor Vehicle Pollution Control Board of the State of California, are approximately met by such devices when operating at constant speeds, but such standards are not actually met during a substantial part of the acceleration and deceleration regimes of operation or during idling. It is expected that these standards will become more stringent in future years and that in all probability other agencies, including many not now existing, will be setting standards for air pollution.

From the foregoing it is apparent that there is great need for an exhaust gas processing system which is far simpler and more straightforward structurally than those presently in use and which is capable of reducing the emission of air pollutants to acceptable levels. It is certainly preferably that such a system accomplish this objective without imposing penalties in operation of the associated engine, such as reduced power output, rough operation, higher heating loads, and lowered reliability.

There is also a need for an exhaust system which is capable of substantially reducing sound levels from the associated engines without imposing a substantial penalty to performance through the introduction of high back pressures. Both in the case of small gasoline engines, such as those used on motorcycles, and in the case of large Diesel trucks, sound levels may approach or exceed the threshold of physical pain; yet these levels are tolerated on the theory that the engines must be permitted to develop their maximum power or their usefulness would be impaired. In such cases, the mufflers used impose a reduced penalty in back pressure but are quite ineffective as a means of reducing sound output. A great advantage would be afforded by a simple and inexpensive exhaust gas processing system which combines the functions of reducing exhaust emissions and sound output to acceptable levels, while actually improving engine operation by reducing back pressure.

It is, therefore, an object of the present invention to provide an exhaust gas processing system for an engine which is simple and straightforward structurally and yet capable of reducing emissions of unburned hydrocarbons to levels substantially below those experienced with devices presently in use.

It is another object of the present invention to provide an exhaust gas processing system for an engine which is simple and straightforward structurally and yet capable of reducing emissions of carbon monoxide to levels below those experienced with devices presently in use.

It is another object of the present invention to provide an exhaust gas processing system for an engine which is capable of reducing emissions of unburned hydrocarbons as set forth above while at the same time substantially reducing the emission of nitrous oxides.

It is another object of the present invention to provide a system for treating exhaust gases which will reduce sound output to acceptable levels and will, at the same time, substantially improve the efficiency of the associate engine by reducing back pressures acting on the engine to values substantially below those usually encountered when conventional mufflers are used.

It is another object of the present invention to provide an exhaust gas processing system for an engine which meets the above objectives of reducing emissions from exhaust and is easily and conveniently adaptable to incorporate the further benefit of positive crankcase ventilation without the disadvantages characteristic of presently used positive crankcase ventilation systems.

It is a further object of the present invention to provide a system for treating exhaust gases which meets the objectives of reducing exhaust emissions, is effective to increase engine efficiency by substantially reducing back pressure on the engine, and at the same time reduces sound output to levels equal to or below those of currently used automobile mufflers.

It is a further object of the present invention to provide an exhaust gas processing system for an engine which overcomes the disadvantages of presently used emission control systems in which emission levels tend to be least effectively controlled during operating regimes when the greatest amount of undesirable emission is produced.

It is a further object of the present invention to provide an exhaust gas processing system for an engine which overcomes another of the disadvantages of emission control systems presently in use in which engine efficiency and power output are adversely affected by required modifications in carburetion and ignition timing to achieve acceptable levels of emissions.

It is a still further object of the present invention to provide an exhaust gas processing system for an engine which avoids the additional disadvantages of emission control systems presently in use which impose on the associated engine both additional pumping loads and higher engine cooling loads.

It is a still further object of the present invention to provide a system for treating exhaust gases which meets the above objectives of reducing exhaust emissions and yet has inherently longer life and greater reliability than the systems presently in use.

It is a still further object of the present invention to provide a system for treating exhaust gases which meets all of the above objectives and is yet inherently much less expensive to produce than most of the currently available emission control systems.

Other objects and advantages will become apparent from consideration of the following specification, taken in connection with the accompanying drawings, in which;

FIG. 6 shows an end view of our exhaust reaction device partly in section with an exhaust inlet velocity control similar to that of FIGS. 4 and 5 and means operated by the exhaust inlet velocity control for varying the inlet air supply.

FIG. 7 shows, in cross section, a portion of a modification of our exhaust reactor which includes a combustion air volume control operated by a barometric damper.

FIG. 8 shows a combustion air volume control by means responsive to intake manifold pressure.

FIG. 9 shows, in section, a portion of an exhaust reactor according to our invention which includes aerodynamic means for controlling combustion air volume.

FIG. 10 shows, in section, a portion of our exhaust gas reactor with a modified form of aerodyamic control of combustion air volume.

FIG. 11 shows, in cross section, an exhaust gas reactor according to our invention including combustion air volume control by reactor exhaust flow.

FIG. 12 shows an exhaust gas reactor according to our invention which includes a combustion air inlet and also a secondary air inlet at the reactor exhaust.

FIG. 12a shows an end view of the device of FIG. 12.

FIG. 13 shows a perspective view of an exhaust gas reactor according to our invention and similar to that shown in FIG. 1 with the additional inclusion of a secondary air inlet and a scroll device for providing mixing of the secondary air with the reactor exhaust.

FIG. 14 is a schematic drawing of an exhaust reactor according to our invention including a secondary inlet to a Venturi section for mixing the reacotr exhaust with outside air.

FIG. 15 is a schematic drawing of an exhaust gas reactor according to our invention including means for adding secondary air to the exhaust gas on a progressive basis as the exhaust makes its way through the reactor.

FIG. 16 is a perspective drawing, partly in phantom, showing a modification wherein a plurality of reactors are attached to the exhaust system of an engine.

FIG. 17 is a schematic drawing of a two-stage version of our exhaust reactor.

FIG. 18 is a schematic drawing of a modification of our exhaust reactor including means for preheating inlet combustion air.

FIG. 19 is a sectional drawing of a modification of our exhaust reactor including an auxiliary internal flow-directing member and an insulation layer surrounding the reactor.

FIG. 19a is a cross section of the reacotr of FIG. 19 taken along line A–A of FIG. 19.

FIG. 19b shows a greatly enlarged portion of the wall section of the reactor of FIG. 19.

FIG. 20 is a schematic drawing of our reactor attached to an engine including means providing positive crankcase ventilation connected between the engine and the reactor.

FIG. 21 is a graph showing the relationships between blowby volume versus intake manifold vacuum.

FIG. 22 is a cross-sectional view of an embodiment of our reactor in which concentric layers are included to reduce length and improve heat conservation.

Figure 1:
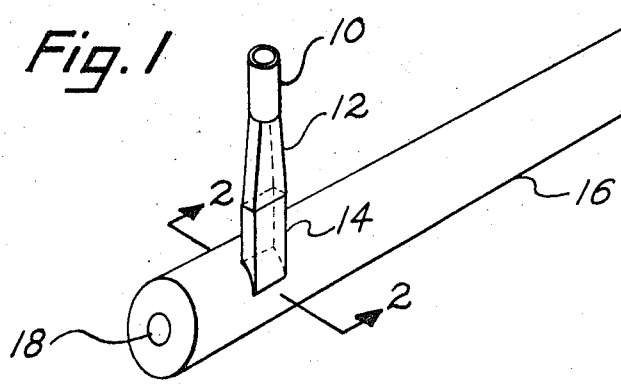
FIG. 1 is a perspective drawing of a simplified form of our exhaust gas reactor with a portion of the inlet section shown in phantom to portray its cross-sectional configuration.
Figure 2:
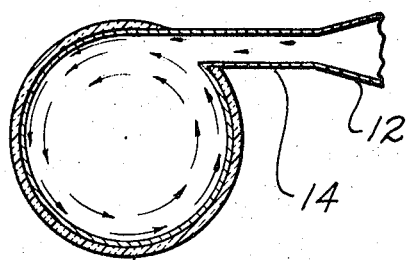
FIG. 2 is an enlarged cross section taken on line 2–2 of FIG. 1.

The most basic form of our reactor appears in FIG. 1 and consists of an exhaust pipe 10 which receives the products of combustion from an engine (not shown). This exhaust pipe includes a tapered section 12 and a flattened section 14 which is joined to an elongated cylindrical reactor element 16 in such manner that the flow from section 14 into reactor 16 is initially substantially tangent to the internal surface of member 16 and essentially perpendicular to its axis. An inlet port 18 is shown at the end of reactor member 16 nearest the exhaust pipe 10. The pattern of exhaust gas flow into reactor 16 may be more readily understood through reference to FIG. 2, which is a cross section taken on line 2–2 of FIG. 1. In this view it will be seen that the exhaust flow from the flattened exhaust pipe section 14 is fed tangentially into the interior of the reactor member 16 in such a way as to create a very rapid circular flow within reactor 16. Because of high velocity of this gas flow, its inherent centrifugal force produces a pressure reduction within reactor 16 adjacent to the inlet port 18. This causes outside air to be pulled into the reactor 16 and to be mixed with the exhaust flow in the general region of the exhaust inlet port. This flow of outside air provides sufficient oxygen such that most of the unburned hydrocarbons in the exhaust stream, which is very hot, are consumed within the reactor 16 before flowing into the atmosphere by means of outlet port 20.

Figure 3:
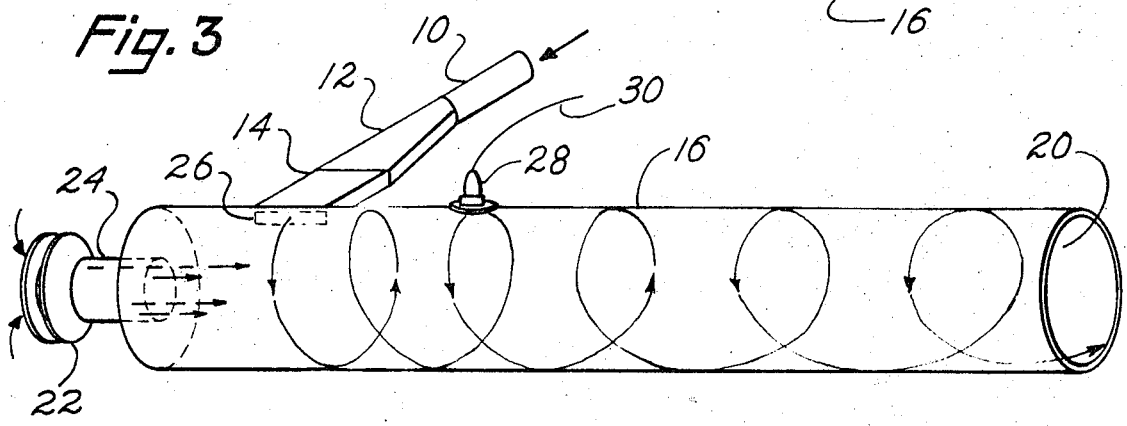
FIG. 3 is a perspective view of a modification of the device shown in FIG. 1 with portions shown in phantom to portray gas flow within the reactor.

A slightly modified form of the device of FIG. 1 appears in FIG. 3 wherein elements having the same numerals are to be considered as identical. FIG. 3 is a perspective drawing of the device of FIG. 1 with additional features and with different parts shown in phantom to aid in the understanding of the gas flows through the reactor. As in the case of FIG. 1, the exhaust pipe 10 includes a tapered section 12 and a flattened section 14 for the purpose of directing the gaseous flow as nearly peripherally to the internal surface of the reactor tube 16 as is practical. FIG. 3 includes a modified form of air inlet device including a spool-shaped section 22 attached at the outer end of an inlet pipe 24. Inlet air flows between the plates of the spool-shaped member 22 and into the interior of inlet pipe 24 from whence it is supplied into the interior reactor 16 as shown by the arrows. The flow of exhaust gas from the flattened section of the exhaust pipe enters reactor 16 by means of the flattened inlet port 26 and begins to flow very rapidly around the interior surface of reactor 16 at an angle which is almost normal to the axis of reactor 16. As this exhaust gas is mixed with inlet air, its direction of flow becomes more and more nearly axial with respect to reactor 16 until it reaches the outlet port 20, at which point it is directed into the atmosphere. To insure combustion of the exhaust gas and air mixture in reactor 16, an igniter device may be in the form of a hot wire, glow plug or a simple spark plug which, in any case, would be connected to a source of electricity (not shown) by means of a wire 30. Alternatively this igniter may be in the form of a catalytic element. For maximum effectiveness, the location of the igniter device 28 along the sidewall of reactor 60 may be quite critical since, as indicated by the spiral flow pattern described, there will necessarily be compressions and rarefactions in the pattern of exhaust gas and oxygen mixture within the reactor, and considerably better combustion may be realized during certain regimes of engine operation if the location of the igniter member 28 is made such as to coincide with a maximum density of the gaseous mixture. A plurality of such igniter devices could be used, if found desirable. Depending upon temperatures and hydrocarbon concentrations in the exhaust flow, the ignition is frequently spontaneous, and no igniter is required. For motor vehicles, concentrations of hydrocarbons are variable over a wide range, and spontaneous ignition quite often occurs during deceleration or idling, but not during low-speed steady-state conditions.

The structure which has been described is extremely simple and straightforward, but the reactions taking place within that structure are relatively complex. As staged above, the most undesirable air pollutants emanating from an internal combustion engine are unburned hydrocarbons or unburned fuel, carbon monoxide and oxides of nitrogen, both NO and $NO_2$. At present it appears that the pollution control agencies are concentrating their efforts on reducing the proportion of unburned hydrocarbons and, to a lesser extent, the proportion of carbon monoxide in engine exhaust emissions. It has recently been discovered that most of the emission control devices presently in use appear to be deteriorating in their effectiveness in dealing with unburned hydrocarbons while at the same time actually increasing the emissions of oxides of nitrogen as compared with engines having no pollution control systems whatever. The customary approach for feeling with unburned hydrocarbons, whether it be through the use of the catalytic muffler arrangements, pumps for supplying outside air into the exhaust manifold, or afterburners, is to complete the combustion of the unburned hydrocarbons. To accomplish this combustion requires all of the following:

1. Sufficient time to permit the combustion to be completed.
2. The maintenance of sufficiently high temperatures that combustion may be maintained over a long enough period to complete the combustion.
3. Sufficient oxygen to support the combustion.
4. Adequate means for mixing the added oxygen with the unburned hydrocarbons.
5. Sufficient absolute pressure to support the combustion.

If any of the foregoing five requirements are not present to a sufficient extent, there will be reduction in the effectiveness of the hydrocarbon combustion reaction. It is also true that the presence of one or more of these factors in the wrong proportion to the others can result in increasing the requirement for others. For instance, the presence of adequate oxygen but inadequate mixing means can substantially increase the amount of time required for satisfactory combustion. Similarly the introduction of an excess amount of oxygen at low temperature can lower the temperature in the combustion area sufficiently either to stop the combustion altogether or to inhibit it substantially such that much extra time is required.

It is now desired to set forth the manner in which the above requirements are satisfied by applicants' reactor. It will be observed from FIG. 3 that the exhaust flow is emitted from port 26 in such manner that it is essentially normal to the axis of the reactor 16. This flow is mixed with the flow of oxygen from the inlet pipe 24 in such manner that a helical flow is established. Because of the helical nature of this flow, the path of the gases is much longer than would be expected in the case of a purely axial flow. A great advantage in time is therefore afforded by this device, and it has been found that, for some installations, acceptable standards of hydrocarbon emissions can be obtained with the reactor only approximately four to six inches long. It will be observed that practically any desired amount of oxygen can be supplied from the inlet pipe 24, depending on its cross-sectional area. However, it has been found that considerably less total oxygen is needed to support combustion in applicants' reactor than is usual in current pollution control devices since, due to the presence of a vortical flow of the exhaust gases, mixing of the oxygen with these gases is extremely efficient. It is highly desirable to minimize the intake of air to some extent since an excess simply results in reducing the temperature of the mixed gases. With respect to pressure, the vortical flow provided by applicants' reactor results in an increase in internal pressure in critical regions for reasons which will be discussed below. Because of this increase in pressure, the shortcomings of numerous "air-sucking" devices which have been tried have been obviated. Such devices normally have used a Venturi type inductor arrangement resulting in a low pressure reaction chamber and very slow rates of combination due to the lowered absolute pressure, as well as substantial cooling due to the expansion of the exhaust gases in the low pressure region of the reactor. The present reactor is quite different from such devices since it must be viewed as an air pump powered by the kinetic energy of the exhaust gases, rather than as an air-sucking device. This is a very fundamental difference between the two devices and in large measure is responsible for its greater effectiveness in dealing with unburned hydrocarbon emissions.

The exhaust pipe 10 is flattened such that the exhaust inlet port 26 of FIG. 3 places as much of the exhaust gas flow as possible essentially tangential to the interior surface of the reactor without introducing substantial back pressure. This tangential injection results in flows at the exhaust port of as high as 1900 feet per second and averaging approximately 1350 feet per second. For a reactor of approximately 2.8 inches diameter, gas at 1350 feet per second would produce in the layer adjacent the inside surface of the reactor a rotational speed of approximately 110,000 r.p.m. or about 11,500 radians per second. This high rotational speed produces a radial acceleration at the reactor wall which is equivalent to 486,000 G (multiples of the normal earth gravity). The compression produced for 486,000 G's can be shown to equal about 140 p.s.i.g. or nearly 10 atmospheres. This compression would theoretically also provide a temperature rise over 400° F. In hydrocarbon reactions, the rate of combination varies as the second power of absolute pressure, which is in this case approximately $(155/15)^2$ or over 100. Thus, with all other factors remaining constant, the oxidation rate will be in the order of 100 times faster due to the adiabatic compression of the centrifuging gases. The above computations are theoretical as to only the outer layer adjacent the inner surface of the reactor, but the values computed to indicate that substantial advantages are provided both in oxidation rate and in temperature conservation.

The temperature rise of over 400° F. (222° C.) provides an additional advantage, as each 10° C. above the threshold temperature almost doubles the reaction rate. As previously indicated, the high rate of turbulence of the vortex action and the perpendicular flow of the incoming combustion air result in extremely effective mixing which further contributes to the high rate of oxidation.

Although standards have not as yet been set for the emission of oxides of nitrogen, the presence of these substances in the exhaust products of internal combustion engines is recognized as deleterious. Under ordinary conditions, nitrogen and oxygen have very little affinity for each other. They do combine, however, at temperatures above about 1900° F., and a portion of the substance so formed will remain combined even after the ambient temperature is substantially reduced. Recent studies have shown that a much higher percentage of nitrogen and oxygen will remain in association when the temperatures are suddenly reduced from the 1900° level to levels near 1200° F. or lower. This temperature change does occur with some of the emission control systems presently in use wherein the very hot exhaust gases from the cylinder are suddenly subjected to a flow of air at substantially ambient temperature. In applicants' reactor, as shown in FIG. 3, the exhaust gases entering through port 26 are normally at temperatures between 1200° F. and 1600° F., and although the temperature will be lowered somewhat through mixing with the additional air supply, it is desirable to hold the temperature within the reactor at substantially this range through whatever distance is required to complete the combustion. It has been found that applicants' reactor does effect a significant reduction in the emission of oxides of nitrogen. This may be attributed to the fact that oxygen is not introduced directly into the extremely hot gases emanating from the cylinder and also because the combustion and subsequent cooling within the reactor occur over a somewhat longer period of time. The more gradual cooling permits disassociation of the nitrogen oxide components before the exhaust flow is released into the atmosphere.

Figure 4:
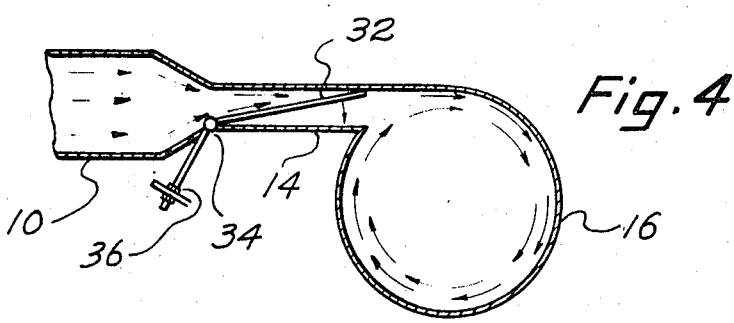
FIG. 4 is a cross-sectional view of a reactor similar to that shown in FIG. 2, but including means for controlling exhaust inlet velocity.

From the aforementioned relationships, it is apparent that increased velocity of the exhaust gas will provide a substantial increase in the centrifugal forces generated in the system. It has been found that these increases in force vary approximately as the square of such velocity increases. In order to avoid excessive back pressure, it has been found desirable to limit the exhaust injection inlet velocity to about 80 percent of sonic velocity. To maintain such velocity throughout the entire operating range of the associated engine would require an adjustable orifice at the exhaust inlet port. FIG. 4 is a cross section of an exhaust reactor device similar to that shown in FIG. 2, but including means for varying the area of the inlet port. Located in the flattened section 14 of the exhaust pipe 10 is a valve member 32 consisting of a flat plate attached to a pivot 34 and having formed with this plate or affixed thereto an arm 36 including an adjustable weight member 38 which is movable in response to the pressure of the impinging exhaust gases to adjust the injection orifice to maintain a fairly constant high velocity of exhaust gas input.

Figure 5:
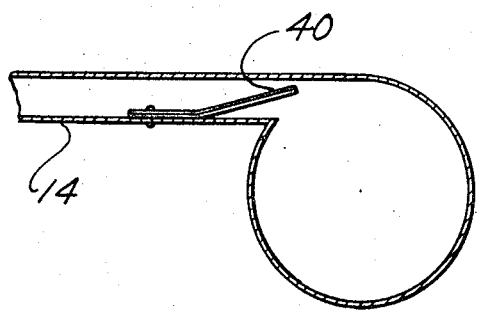
FIG. 5 is a cross-sectional view similar to that of FIG. 4, but showing a temperature-responsive exhaust inlet velocity control.

FIG. 5 shows another embodiment of variable exhaust inlet arrangement wherein the flattened part of the exhaust pipe 14 is shown connected to the reactor 16 with a bimetallic valve member fastened to the wall of section 14 in such manner that it varies the effective area of the port admitting exhaust gases into reactor 16. When the associated engine is operating at low or moderate speeds and/or under light load, neither the pressures nor the temperatures of the exhaust gases will be particularly high, the valve member 40 will remain in an operating position essentially as shown, thereby constituting an effective restriction of the area of the inlet port. When the engine is operating in a high output regime and the exhaust gases are hotter and relatively greater in volume, the bimetal valve element 40 will deflect downwardly such that the effective inlet area is increased to permit a greater amount of flow into the reactor 16 for a given pressure differential. In this manner the flow is kept very nearly tangential relative to reactor 16, but excessive back pressures under high output conditions are avoided through the temperature-responsive means for increasing the area of the exhaust inlet port.

A somewhat different embodiment of inlet area control is shown in FIG. 6. In this device, a spring-loaded valve member 42 is loaded by means of a spiral spring 44 such that some resistance is imposed to flow through the flattened exhaust pipe section 14. As the flow increases, the pressure acting upon valve member 42 and hence against spring 44 increases; thus the effective area increases in response to this higher engine output. As previously indicated, it has been found highly desirable to limit the supply of cool inlet air because an excess of air supplied over that which is required to support combustion results in lowering the temperature within reactor 16 and therefore decreases the rate of combustion. The embodiment shown in FIG. 6 utilizes a valve member for varying the area of inlet port 18 in response to changes in the exhaust inlet area as controlled by valve member 42. Attached to the valve member 42 are links 46 and 48 which move a valve member 50 over the inlet port 18. At idle flows the valve member 42 is at a reduced area, and the effective area of the inlet flow is at a maximum. At high exhaust flows, as valve member 42 opens the links 46 and 48 move to pivot valve member 50 in a direction to decrease the effective area of the air inlet port 18.

FIG. 7 shows a partial sectional view of a reactor having an air inlet valve responsive to a gas differential pressure in order to control the effective area of the air inlet. In this embodiment, the reactor 16 is shown in section with the exhaust inlet port 26 positioned near its periphery. Attached to the end of reactor 16 are a plurality of support members 52 which carry a plate 54 movable to provide a variable obstruction to the air inlet port 18. Plate 54 is movable in response to the differential gas pressure across it against the resistance imposed by a number of light springs 56 carried on support members 52. With this device at idle, the springs hold the inlet air supply port at maximum area. The initiation of moderate flows through port 26 into reactor 16 will create a small vacuum which will tend to pull plate 54 toward port 18 against the action of springs 56, thereby effectively reducing the area for inlet air. As the flows through port 26 become greater as the engine reaches higher power regimes of operation, there will be substantial vacuum acting against the inside of plate 54 in a direction to oppose the springs 56 and causing the plate 54 to move inwardly, thereby permitting less air to flow into the reactor 16 to mix with the exhaust gases, since less air is needed for high throttle operation.

FIG. 8 shows a partial cross-sectional view of a reactor 16 and inlet port 26 similar to that sown in FIG. 7, but with a somewhat different arrangement for control of the inlet air. In this device, air is supplied through the orifice 18 from a smaller diameter cylindrical extension 58 which includes a plurality of radially disposed ports 60. The effective area of the pathway for air to flow into the reactor 16 is controlled by means of a circular plate 62 which travels on the inside of cylindrical extension 58. Plate 62 is attached to a rod 64 which is, in turn, connected to a pressure transducer 66 which responds to the instantaneous pressure sensed in the intake manifold of the associated engine. The pressure transducer 66 could take any of a number of forms well known in the art. Obviously, one of the simplest forms would be that of a bellows device connected to respond directly to the pressure (or vacuum) in the intake manifold to translate the rod 64 and the circular plate 62 axially. Under closed throttle conditions there is a higher proportional amount of contaminants, and more air is required. At higher engine outputs the exhaust flow is greater, but less air is needed because the proportion of contaminants is lower. Therefore the pressure transducer will move plate 62 in an area decreasing direction with increasing intake manifold pressure (decreasing vacuum). Although it would be subject to disadvantages because of the possibility of fouling, the pressure transducer could also be operated from the exhaust manifold. In such case the area of the inlet air port would increase with decreasing exhaust manifold pressure.

FIG. 9 also shows a partial cross-sectional view of a reactor 16 having an air inlet port 18 and including also a smaller diameter extension 68 including a flange member 70 to which a circular plate 72 is attached. Plate 72 has an internal configuration consisting of a smoothly contoured face 74 which directs inlet air flowing radially between flange 70 and plate 72 smoothly into an axial pattern toward the orifice 18. The flow characteristic of the device of FIG. 9 is that its flow is directly proportional to the area of the opening between flange 70 and plate 72, multiplied by the square of the pressure drop across this opening.

A similar embodiment is shown in FIG. 10 wherein a partial cross-sectional view of a reactor 16 has attached thereto a smaller diameter cylindrical section 74 including an air inlet port 76 of limited cross-sectional area. It will be observed that the inlet port 18 supplying air to the interior of reactor 16 is of smaller area than with most of the above-described embodiments, and this smaller area orifice operates in cooperation with a plurality of smaller area orifices 76, 78 and 80, which are axially nonaligned with each other. In this manner, the inlet air is forced through a somewhat tortuous path from the outside to the interior of the reactor 16 which results in increasing the pumping resistance with the volume of flow. It has been found that the air flow into this device is directly proportional to the average area of the orifices times the pressure drop thereacross. The embodiment shown in FIG. 10 has been found to produce a somewhat higher percentage of combustion air during idle and deceleration modes than does the device shown in FIG. 9, but less at high speeds.

FIG. 11 shows an embodiment of our reactor in which combustion air volume is controlled by means of an arrangement responsive to reactor exhaust volume. In this embodiment, reactor 16 is shown having an outwardly directed flange 84 at its exit end, and attached to this flange are a plurality of bolts 86. A plate is carried on bolts 86, and each of the bolts is supplied with a light helical spring 87 interposed between the flange 84 and the plate 88. An elongated rod 90 is attached to the center of plate 88 at one end, and at its opposite end carries a smaller plate 92 which operates in conjunction with the inlet orifice 18 to control the effective area of the air inlet passageway. Rod 90 is supported at the inlet end by means of a plurality of legs 94 fastened to the outside of reactor 16 and to a centrally directed boss 96. With the embodiment shown in FIG. 11, it will be apparent that at relatively low flows of exhaust gas emitted from port 26 there will be a limited amount of pressure acting upon plate 88, and the area from which exhaust gas is emitted will be somewhat limited since the internal pressure in reactor 16 will not be sufficient to move plate 88 outwardly against the force of the springs 87 which tend to hold the plate 88 in a position defining minimum exhaust area. Correspondingly, the plate 92 will also be held in a position affording minimum flow area for the intake air flow. When the flow from the exhaust port 26 becomes substantial and the pressure levels build up within the reactor 16, the plate 88 will be moved toward the right, thereby stretching the springs 87 and increasing the effective exhaust area. At the same time, plate 92 will be moved toward the right, increasing the effective area between plate 92 and the edges of the inlet orifice 18. Thus a direct relationship is maintained between the area of the exhaust port and the area of the inlet air port.

It has been found that for many applications the exhaust temperatures at the point of final exit afforded by the reactor arrangements thus far described may be too high for safety, since the desired combustion in the reactor results in temperatures in the 1200° F. to 1600° F. range. In FIG. 12, the reactor 16 is shown as having an inlet air port 18 and an exhaust inlet port 26. The reactor in this case includes an end plate 98 having a contoured inner surface 100 arranged to direct exhaust flow radially outwardly from the reactor. This radial flow causes outside air to be pulled through the plurality of orifices 102 in member 98 and to be moved with the exhaust. An end view of the reactor showing the face of plate 98 is shown in FIG. 12a. By proper choice of areas of the ports 102, the amount of cool outside air available to be mixed with the exhaust area can be made sufficiently great that the desired cooling of the exhaust gases can be effected. An additional benefit which has been experienced with this configuration is that this mixing can substantially reduce the emission of carbon monoxide from the reactor.

A somewhat different arrangement for providing mixing of outside air with the exhaust flow is shown in FIG. 13, in which the exhaust pipe 10 includes a transition section 12 and a flattened inlet section 14 attached tangentially to the reactor 16. The combustion air inlet in this particular version is shown as including a pipe 104 of smaller diameter than the reactor. It will, of course, be apparent that other arrangements previously described may be used. At the exhaust end of reactor 16 is incorporated a scroll-shaped member 106 which serves to convert the axial component of the exhaust gas movement into a radial movement with the exhaust being emitted through an outlet port 108. As the exhaust gases flow around the scroll within member 106, a lower pressure level is produced near its center, and at this location an air inlet port 110 is provided. Because of the lowered pressure inside, outside air flows through inlet port 110 into the scroll member 106 and mixes with the exhaust gases before they are emitted from exhaust port 108. This mixing reduces both the temperature of the exhaust gases and the carbon monoxide content of the exhaust gases.

Another device for mixing the exhaust gases with outside air is shown in schematic form in FIG. 14, wherein the reactor 16 includes an air inlet conduit 112 and an exhaust gas inlet conduit 26. A baffle plate 114 is included at the exhaust end of the reactor 16, said baffle plate having a smoothly contoured interior surface for directing the exhaust flow outward radially. Associated with the exhaust port 116, which in this case terminates a smaller diameter section 118 of the reactor, is a Venturi arrangement wherein the smaller diameter section 118 and the contoured portion of end plate 114 cooperate with the curved outside jacket member 120. When a substantial exhaust flow is emitted form port 116, there is a reduction in pressure at the inlet 122 of the Venturi section, and this reduction in pressure pulls air inwardly, as shown by the arrows, where it is mixed with the exhaust flow before being discharged radially at the outlet port adjacent deflecting plate 114. This mixing arrangement is also effective to reduce both the temperature and the carbon monoxide content of the exhaust flow.

FIG. 15 shows a modification of our exhaust processing device in which an arrangement is provided for permitting inlet air for combustion to be added to the exhaust gases at a predetermined or programmed rate as the gases flow through the reactor. The gases enter the reactor through the tangential exhaust inlet port 26, as before, but the end wall of reactor 16 adjacent the e inlet port 26 is closed, and fastened thereto and supported thereby is a pipe 124 which extends the entire length of the reactor 16 and at its opposite end is supported by a baffle member 126 whose principal function is to direct the exhaust flow radially outward after passing through the reactor. Positioned along the pipe 124 are a plurality of ports 128. These ports permit the air which flows into the open end of pipe 124 to be mixed with the exhaust gases, but in the proportion established by the effective area of the ports along the length of the pipe 124. Near the exhaust inlet port it is desired to add only limited amounts of air to avoid creating a substantial reduction in the temperature of the mixture; therefore, only a relatively small effective area is available for the air to flow through the ports 128. As the vortex flow proceeds down the reactor 16 toward the exhaust end, increasingly greater numbers of ports 128 provide increasing amounts of air to support the combustion. Although circular ports are shown, other configurations may be desirable for specific applications. Thus this device has particular advantages in conserving the combustion temperatures so that the combustion can proceed at the maximum acceptable rate. It will, of course, be recognized that this arrangement might be used in combination with an insulating jacket around reactor 16, as described below, or, where temperature compensation appears to be a particular problem, in combination with a two-stage reactor device, also described below.

FIG. 16 provides a simple schematic showing of an L-head internal combustion engine 130 having a plurality of reactors 132, 134 and 136, each of which might be attached directly to Siamesed exhaust ports of the engine. Shown in phantom to avoid obscuring the connection of the reactors to the engine is a simple log-type air manifold which provides inlet air to the separate reactors. Each of these reactor members then discharges the processed exhaust flow into a single exhaust pipe 138. It will be recognized that the numbers of such small reactors applied to an engine might be chosen so as to match with the exhaust ports of the engine, or a very simple manifold structure could be provided to couple two or three cylinders to a single reactor member. In the case of the prevalent V-8 type engine, it might be preferable to assign only a single reactor to each bank.

FIG. 17 shows a two-stage reactor having a first reactor section 16 and a flattened exhaust pipe section 14 which feeds through a port 26 and into the exhaust reactor as previously described. An air inlet conduit 140 provides air to the first stage of the reactor for combustion. The gases discharging from the first-stage reactor 16 pass through a discharge port 142 into the second-stage reactor 144 which is larger in diameter than reactor 16 because of the reduced pressures at this stage in the process. As before, the gases discharged into the reactor are directed essentially tangentially to the interior surface of the cylindrical reactor section in such manner as to provide a helical flow as described with respect to the first stage. Again, because of the reduced pressure at the center of this helical flow, combustion air is pulled into the reactor section 144 through an air inlet port 146. In this manner, the contaminants not consumed in reactor section 16 will be consumed within the reactor 144 before being discharged from the outlet port 148.

As previously indicated, it has been found extremely undesirable to dump excessive quantities of cold air into the reactor adjacent the exhaust inlet port. In the embodiment shown in FIG. 18, the reactor 16 includes an exhaust inlet port 26, an air inlet port 18, and a heat exchanger 150 which receives outside air and which is in contact with the surface of reactor 16 to sufficient extent to provide a substantial heating of this outside air before it is supplied to the inlet port 18 through a conduit 152. In addition to conserving heat for the reaction occurring in chamber 16, the heat exchanger also provides the additional advantage of removing heat from the downstream portion of the reactor, thereby reducing the temperature of the exhaust as it is discharged into the atmosphere.

In the embodiment shown in FIG. 19, the basic reactor member 16 includes an exhaust inlet port 26 and an air inlet port 18. The exhaust outlet includes a baffle member 154 which serves to direct the exhaust flow radially outwardly from the reactor. An insulating layer 156 is provided, surrounding the reactor member 16 for the purpose of aiding in the conservation of heat to enhance the combustion process. At the temperatures which prevail, it has been found that reflective insulation is significantly more effective than the usual fibrous mineral type of insulation which is more effective at substantially lower temperatures. For this reason, the preferred form of the insulating layer 156 would include adjacent the surface of reactor 16 or in close proximity therewith a layer or layers of highly reflective metal for redirecting the heat back into the reactor and minimizing outward radiant heat loss. Concentrically positioned outside of this reflecting layer would preferably be a layer of fibrous mineral insulation.

It will be appreciated that this insulating layer, in addition to conserving heat, will also be effective in reducing noise which otherwise might tend to flow through the wall of reactor 16.

An additional feature of this embodiment is the inclusion of a helical baffle member 158 within the interior of reactor 16. The purpose of this baffle member is twofold: first, it directs the flow of exhaust gases into a helical or spiral pattern so that the desired, necessarily elongated, flow path is assured to provide additional time for complete combustion. Also, it has been determined that most of the sound energy within the reactor 16 tends to flow axially through the reactor and directly out of the outlet port. The inclusion of this baffle so effectively impedes this axial flow that the sound levels emanating from the reactor are at least as low as those normally provided by the best standard automotive mufflers. FIG. 19a is a section taken on line A–A of FIG. 19, which is a section taken through the inlet section 14 of the reactor and the inlet port 26, looking toward the air inlet port 18. The flow of gas and sound into the reactor is shown by the pattern of arrows entering the tangential flattened exhaust pipe portion 14, and the exhaust gas circulates essentially circumferentially as shown by the solid arrows. The sound travels with this gas until it reaches the region where the gases begin to rotate, and then it is directed toward the axis or center of the reactor where it tends to cancel itself out in the form of heat. Thus, there is a significant sound-damping effect through this reactor arrangement, even though no additional means are provided for dealing with sound emission. The sound which is transmitted through an unbaffled reactor, as stated previously, does tend to flow axially through the reactor and out of the exhaust port. The presence of the baffle member 158 substantially inhibits this axial flow. FIG. 19b is a greatly enlarged portion of the wall of the reactor 16 shown in FIG. 19, and arrows similar to those shown in FIG. 19a are included here for the purpose of indicating that although the exhaust flow may be in an essentially circumferential or wheel" pattern as shown with the solid arrows, the sound tends to be directed toward the center as shown with the dashed arrows.

In FIG. 20, an exhaust reactor similar to that described above, with particular reference to FIG. 3, is shown attached to a typical automotive engine 159 having an exhaust manifold 160 and a crankcase vent pipe 162. The exhaust manifold is connected to an exhaust pipe 10 which is, in turn, connected to the reactor 16 in the manner previously described. An air inlet pipe 164 provides combustion air for the reactor 16. A conduit 166 is connected to the air inlet conduit 164 and also to the engine 159 such that it communicates with the crankcase above the oil level therein. Because of the inherent air pumping action of the reactor 16, air is pulled from the atmosphere into inlet conduit 164 in the manner previously described. At the same time, the lowered pressure produced by the reactor 16 and the air flow through conduit 164 is communicated through conduit 166 into the crankcase region of the engine 159. This causes air to flow into the crankcase through the vent pipe 162 to displace the normal blowby gases which tend to collect in this area, and these gases are pulled through the conduit 166 and conduit 164. They are then mixed with the incoming air in the reactor 16 and are thereby consumed in the reactor.

FIG. 21 is a graph showing a number of the relationships which arise from the operation of the device shown in FIG. 20. Additionally, these relationships are compared with those in presently used positive crankcase ventilation devices. As previously stated, the blowby gases found in the crankcase of engines are very rich in unburned fuel, both because part of the blowby occurs before ignition on the compression stroke and partially because during the combustion process, with its high cylinder pressures, part of the gas near the cylinder wall is often not completely burned. In the conventional crankcase ventilation system, the conduit from the crankcase is connected to the intake manifold. It will be observed that one of the relationships plotted on the graph of FIG. 21 is that of intake manifold vacuum versus cylinder head pressure. When the intake manifold vacuum is at a maximum, cylinder head pressure is at a minimum, and the relation is substantially linear to the point where cylinder head pressure is at a maximum and intake manifold vacuum is at a minimum. Directly crossing the dotted line representing this relationship is a solid line entitled "Cylinder Head Pressure and Blowby Volume." This graph shows that blowby volume varies directly with cylinder head pressure. Yet the intake manifold vacuum which is relied upon to operate the conventional positive crankcase ventilation system varies in the opposite direction. Manifold vacuum is at a high value at a time when little blowby gas is produced and at a very low value when the greatest amount of such gases are produced. This relationship clearly operates to limit the effectiveness of the conventional device in dealing with this problem, even if the aforementioned difficulties with the customary valve member used are not considered. On the right side of the graph the quantity "Vacuum by Exhaust Reactor in Inches $H_2O$" is plotted on the vertical scale. It will also be observed that the graph includes a dotted line showing a substantially linear relationship from a minimum vacuum in the exhaust reactor and a minimum cylinder head pressure to a value of about 4 inches $H_2O$ vacuum in the reactor at maximum cylinder head pressure. Thus the vacuum produced by the exhaust reactor 16 of FIG. 20 at the air inlet port varies indirect proportion with the cylinder head pressure and with the volume of blowby gases produced in the associated engine. In this manner the simple conduit or tube 166 extending from the crankcase to the combustion air inlet for the reactor 16 provides ideal crankcase ventilation proportional to the need. A substantial proportion of the maintenance problems experienced with conventional positive crankcase ventilation devices occur because of the aforementioned inverse relationship of intake manifold vacuum vs. cylinder head pressure since extremely high manifold vacuums at low power output typically cause some oil droplets to be sucked into the chamber of the positive crankcase ventilation valve, resulting in an accumulation which ultimately interferes with the proper operation of the valve. In the present system no such valves or any moving parts are involved, and thus no maintenance is required for the positive crankcase ventilation system.

The fact that an actual vacuum is produced by the exhaust reactor, as described in FIG. 21, is very significant because experience has shown that the reactor is capable of producing actual negative pressures within the exhaust manifold under certain modes of engine operation. Thus, not only are negative pressures developed at the center of the helical flow to pull in outside combustion air, but the reactor also operates to scavenge the exhaust manifold of the engine. As such, it adds significant power to the engine rather than reducing the power as do the exhaust pollution control devices presently in use and as do most mufflers. The average muffler creates an exhaust back pressure of approximately 30 inches $H_2O$, whereas the back pressures measured with the applicants' reactor system have varied from actual negative values to values of the order of 3 to 5 inches $H_2O$. The reason for this action appears to be that the extremely high velocity pressures produced at the time the exhaust valve opens result in a high velocity flow with a high level of kinetic energy. This kinetic energy is conserved in the reactor by the helical flow pattern against the smooth inner surface of the reactor. With reference to devices using the exhaust baffle as shown in FIGS. 11, 12, 13, 15, 18 and 19, this stored energy in the form of centrifugal energy is converted into radial velocity at the exhaust port. This results in a lowered pressure in its reactor which is transmitted back through the reactor as a lowered exhaust manifold pressure. Even where the exhaust baffle plate is omitted, a similar pressure reduction is measurable. The benefit conferred by this feature is substantial, since the resulting improvement in engine operation is great enough to make use of the reactor worthwhile even if neither the sound control advantages nor the exhaust emission control advantages were present.

FIG. 22 is a schematic sectional view of an embodiment of our exhaust reactor having special advantages where the available dimensions for installation make it difficult or impossible to use an elongated tube. In this device the basic reactor section 170 has an exhaust inlet port 26 and an air inlet port 172 as described above. When the helically moving gases have traveled to the end of section 170, they are diverted by means of an end baffle plate 174 and caused to move radially outwardly until they meet the walls of a cylindrical member 176 connected to end plate 174. These walls divert the gases back over the outside surface of section 170 until they are blocked by an end wall of an outside housing and diverted along a path between the outside of walls 176 and said housing to an outlet port 180. This embodiment, in addition to conserving space, also has advantages in conserving heat since the exhaust gases flowing past the outside of section 170 effectively reduce the flow of heat through its walls. Since the main part of the reaction occurs in the inside section or, at most, in the two inside sections, the housing 178 could have almost any desired cross-sectional configuration, such as square, rectangular, oval, etc., depending on the available space for installation.

One of the most difficult problems presented in exhaust emission controls is that of controlling the emissions from Diesel trucks and buses and other Diesel engines. No present system, as used commercially today, is really adaptable to Diesel engines. Although visible dark smoke is frequently present in large amounts and the exhaust odors are very objectionable, the Diesel engine now meets California standards for hydrocarbon and carbon monoxide emissions. During modes of high acceleration, however, raw fuel, smoke and other contaminants are present in substantial concentration in Diesel exhausts.

Because the Diesel exhausts during steady state operation are normally too clean to burn, operation with the reactor device shown herein will necessarily be intermittent. Thus, one or more of the above described igniter devices, such as a spark plug, will be required. The operators of commercial Diesel equipment have consistently resisted the use of exhaust systems which provide substantial back pressures, for reasons of economy. Yet such back pressures are almost a necessary byproduct of the use of effective mufflers as presently available. With the above-described advantages in lowering or eliminating back pressures, as well as providing effective muffling, applicants' reactor meets the objection as to economy while providing significantly improved operation.

While several embodiments have been shown and described, most of these involve additions to the basic system. Obviously, many of the features of these different embodiments may be combined to meet particular requirements. Except where obviously incompatible, the inlet configurations described could be used with any exhaust port configuration. The heat exchanger can be used with any exhaust port configuration and with the positive crankcase ventilation device. While the basic reactor has been described as essentially cylindrical, this configuration is required only for the first few inches past the inlet port of the reactor, and shapes using many cross sections may be used to accommodate particular problems in using available space. Other modifications will occur to those skilled in the art, and we do not desire to be limited to the modifications and embodiments disclosed nor other than by the scope of the following claims.

We claim:

1. An exhaust gas processing device for use with a combustion engine comprising:
    an exhaust pipe connected to receive the gaseous combustion products from said engine;
    a reactor member containing an open chamber of substantially cylindrical cross section over at least a substantial portion of its length, said length exceeding its diameter by at least a two-to-one ratio, air inlet means adjacent the reactor axis communicating with a source of air at atmospheric pressure, an exhaust outlet, and an exhaust inlet port in the sidewall thereof, said exhaust pipe connecting with said exhaust inlet port substantially tangentially with respect to said reactor chamber and causing the exhaust stream to be directed tangentially against the cylindrical interior surface of said reactor chamber in a plane almost perpendicular to the axis of said reactor whereby said exhaust stream is constrained into a vortical pattern having a high angular velocity in a helical path from end to end of said chamber, said vortical flow pattern being characterized by a relatively low pressure core, which induces air inflow through said air inlet means, said air mixing turbulently with said helically flowing exhaust stream, the mixed gases being subject to centrifugally induced gradients of both pressure and temperature, heating by adiabatic compression, and turbulent mixing, all of which accelerate combustion of unburned gases within said exhaust flow.

2. An exhaust gas processing device as set forth in claim 1 wherein high temperature ignition means are incorporated into said reactor chamber.

3. An exhaust gas processing device as set forth in claim 1 wherein means are provided for varying the effective area of said air inlet means.

4. An exhaust gas processing device as set forth in claim 1 wherein a helical baffle member is incorporated into said reactor chamber, said baffle being of varying pitch such that flow near said exhaust inlet port is directed almost circumferentially and with a small axial component and flow near said exhaust outlet has a large axial component.

5. An exhaust gas processing device as set forth in claim 1 wherein said chamber in said reactor member includes a first substantially cylindrical member containing said air inlet means and said exhaust inlet port, a second member having walls substantially coaxial with said first member and positioned outside of said first member and including an end member which cooperates with said walls to redirect said exhaust stream over a large proportion of the outside surface of said first member and a third member positioned at least partly outside of said second member for redirecting said flow in a desired direction.

6. An exhaust gas processing device as set forth in claim 3 wherein said area varying means is responsive to the gas flow in said exhaust pipe.

7. An exhaust gas processing device as set forth in claim 1 wherein air mixing ports are included adjacent said exhaust outlet for mixing exhaust gases with said ambient air before discharging said exhaust stream into the atmosphere.

8. An exhaust gas processing device as set forth in claim 1 wherein a second exhaust reactor member having a cylindrical reaction chamber and an air inlet port is connected to said exhaust outlet of said first reactor, said connection including a port for discharging the exhaust stream from said first named reactor chamber essentially tangentially into the reaction chamber of said second exhaust reactor member.

9. An exhaust gas processing device as set forth in claim 1 wherein a heat exchanger is connected to said reactor member for transferring heat from said member to ambient air in said heat exchanger, and a conduit is connected between said heat exchanger and said air inlet means for supplying heated air to said air inlet means.

10. An exhaust gas processing device as set forth in claim 1 wherein a helical baffle member is incorporated into said reactor chamber for directing exhaust gas flow.

11. An exhaust gas processing device as set forth in claim 1 wherein insulation means are provided surrounding said reactor chamber member.

12. An exhaust gas processing device as set forth in claim 1 wherein a conduit is connected between the crankcase of said engine and said air inlet port such that blowby gases in said crankcase are vented into the inlet air supply to said reactor chamber.

13. An exhaust gas processing device as set forth in claim 12 wherein said exhaust pipe terminates in a partially flattened end portion.

14. An exhaust gas processing device as set forth in claim 13 wherein valve means are incorporated in said flattened end portion of said exhaust pipe for varying the effective flow passage area of said end portion.

15. A gas-operated exhaust gas processing device for use with a combustion engine comprising a first pipe including an air inlet port adjacent the axis of said pipe communicating with a source of air at atmospheric pressure and an exhaust outlet, said pipe being essentially cylindrical in cross section and of length at least twice its diameter; and a second pipe connected to said engine and to said first pipe such that the flow from said second pipe is directed essentially tangentially to the interior surface of said first pipe and in a plane nearly perpendicular to its axis, thereby producing a high velocity circular flow within said first pipe utilizing the kinetic energy of said gas flow to produce high pressures against the interior surface of said first pipe and low pressures along its axis, and said air inlet port is so located that the flow of exhaust gases into said first pipe causes air to be forced by atmospheric pressure into said first pipe and mix with said exhaust gases to aid in combustion of said gases within said first pipe and the resulting mixture assumes a vortex flow pattern with an increasing axial component with respect to the axis of said first pipe as the exhaust flow approaches said exhaust outlet.

16. An exhaust gas processing means as set forth in claim 15 wherein igniter means are incorporated in said first pipe.

17. An exhaust gas processing means as set forth in claim 16 wherein said igniter means includes at least one spark plug.

18. An exhaust gas processing means as set forth in claim 16 wherein said igniter means includes at least one glow plug.

19. An exhaust gas processing means as set forth in claim 16 wherein igniter means are incorporated in at least one hot wire.

20. An exhaust gas processing means as set forth in claim 16 wherein igniter means are incorporated in at least one catalytic igniter.

21. An exhaust gas processing means as set forth in claim 15 wherein means are included for mixing ambient air with the exhaust gas prior to its being discharged from said exhaust port.

22. An exhaust gas processing means as set forth in claim 21 wherein said means includes Venturi means associated with said outlet port for combining outside air with said exhaust gas flow.

23. An exhaust gas processing device as set forth in claim 21 wherein said means mixing ambient air with exhaust gas includes a flow-directing device for directing exhaust gas flow radially from said outlet port.

24. An exhaust gas processing means as set forth in claim 21 wherein said exhaust gas flow-directing device includes a scroll-shaped deflector defining at least one path directing said exhaust gas radially and an ambient air inlet port connected with said path.

25. An exhaust gas processing means as set forth in claim 23 wherein said means mixing ambient air with exhaust gas includes a plurality of ports communicating outside air with said radially directed exhaust gas flow such that air flow through said ports varies with said exhaust gas flow.

26. An exhaust gas processing device for use with a combustion engine comprising:

an exhaust pipe connected to receive the gaseous combustion products from an engine;

a reactor member containing a chamber of substantially cylindrical cross section over at least a substantial portion of its length, said length being at least twice the diameter of said chamber and having an air inlet port to said chamber, an exhaust outlet, and an exhaust inlet port at the sidewall thereof, said exhaust pipe connecting with said exhaust inlet port at an angle slightly displaced from perpendicular with respect to said reactor chamber and causing the exhaust stream to be directed essentially tangentially against the cylindrical interior surface of said reactor chamber and in a plane almost perpendicular to the axis of said reactor chamber whereby the kinetic energy of said stream is utilized to create a high static pressure on said gases as they rotate against said interior surface and conversely a low static pressure within the central portion of the chamber;

and means communicating said central portion with said air inlet port which causes said air containing oxygen to be forced into the reactor by atmospheric pressure whereby said air is mixed with said gases and combustion of said gases in said reactor chamber is greatly accelerated.

27. An exhaust gas processing device as set forth in claim 26 wherein said air inlet port comprises a pipe extending through a substantial part of the length of said reactor essentially along said central portion, communicating with ambient air at one end and being closed at its opposite end, said pipe having a plurality of radial ports communicating said ambient air with said low pressure region in said central portion.